Sept. 9, 1958  C. E. KRAUS  2,850,911
TORUS TYPE POWER TRANSMISSION
Filed Jan. 6, 1956  5 Sheets-Sheet 1

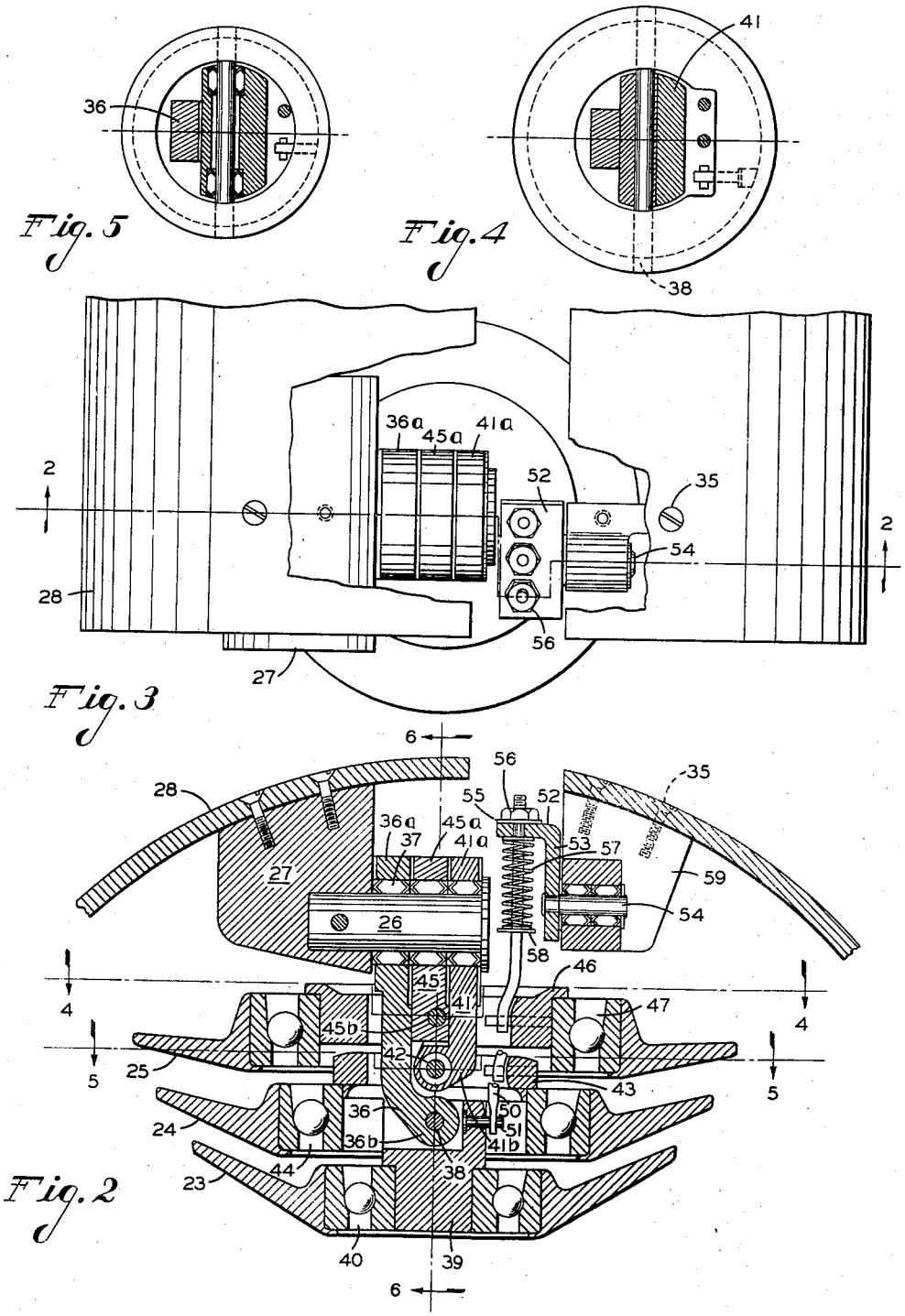

Sept. 9, 1958            C. E. KRAUS            2,850,911
TORUS TYPE POWER TRANSMISSION Filed Jan. 6, 1956                                         5 Sheets-Sheet 3

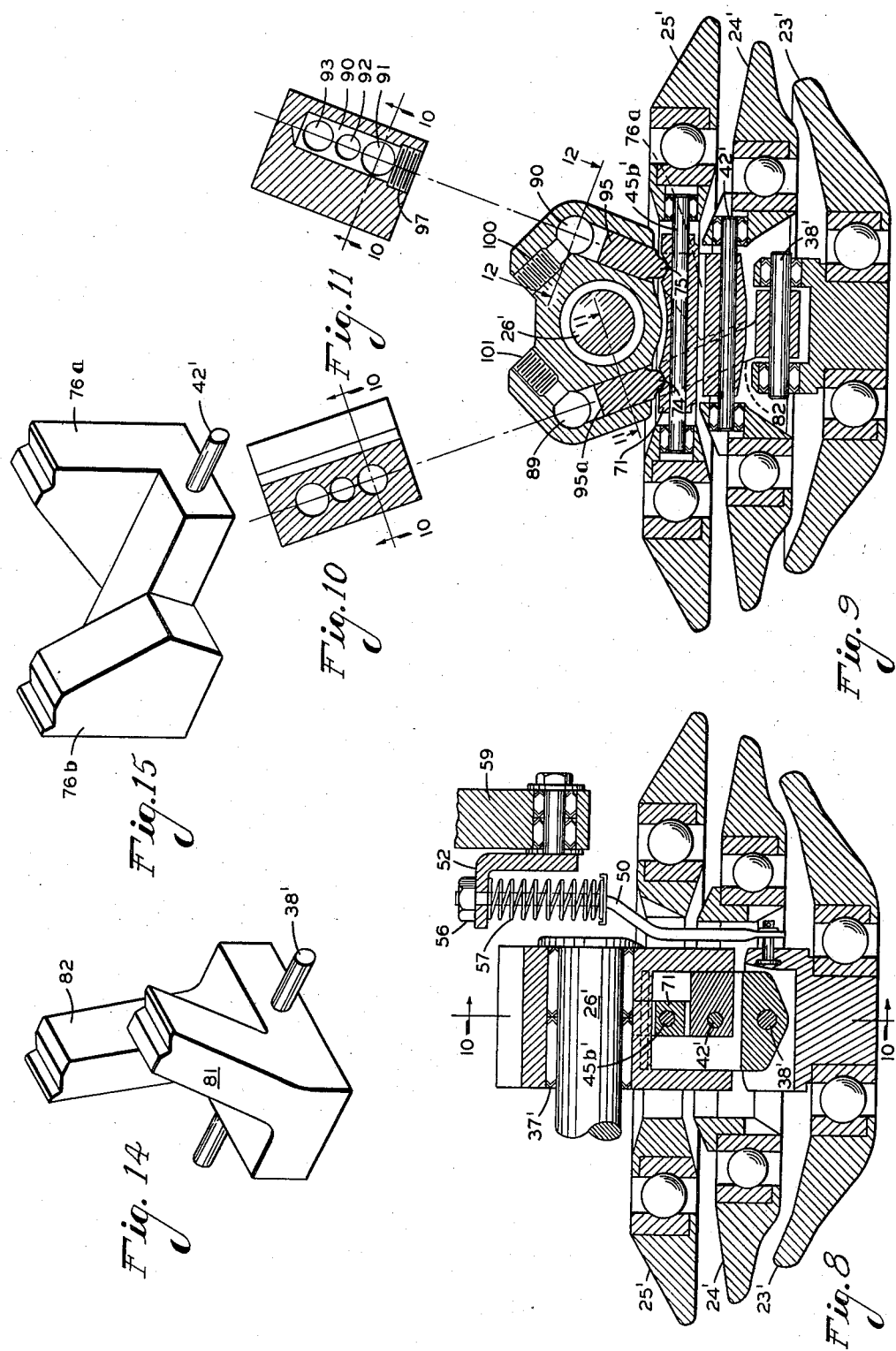

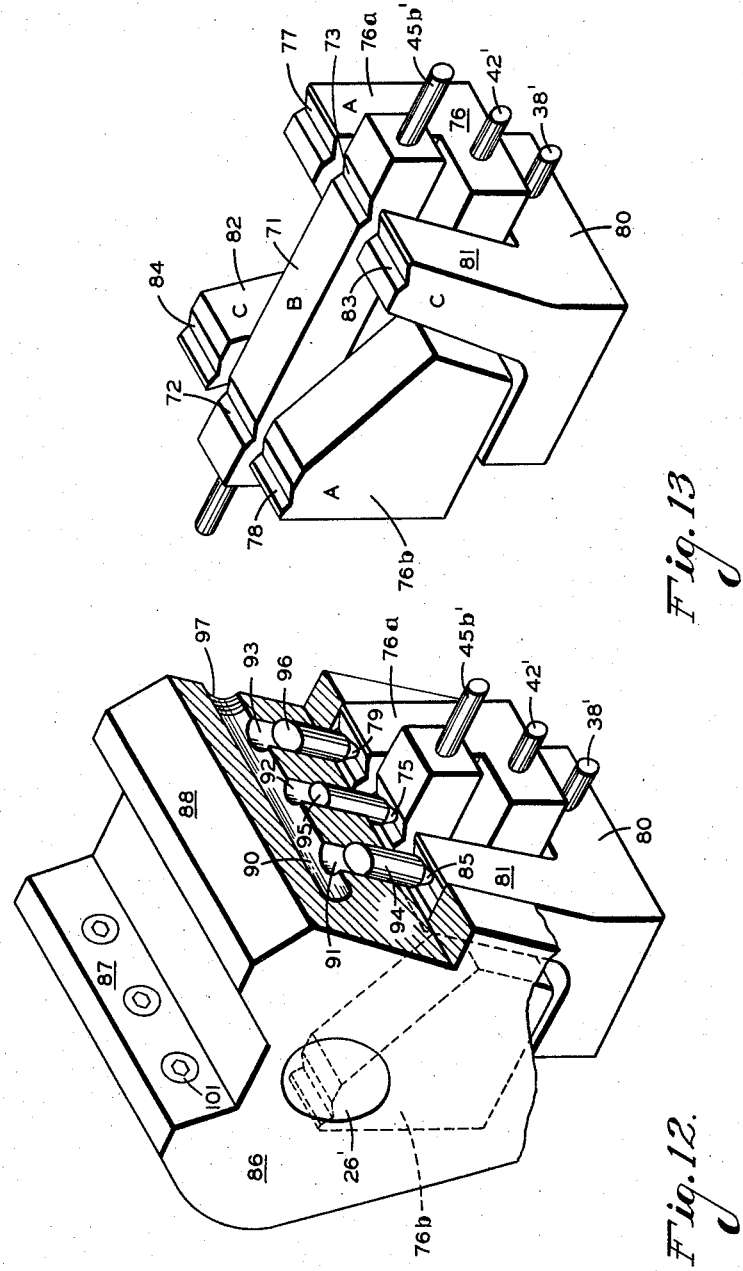

United States Patent Office 2,850,911
Patented Sept. 9, 1958

2,850,911

TORUS TYPE POWER TRANSMISSION

Charles E. Kraus, Rochester, N. Y.

Application January 6, 1956, Serial No. 557,666

29 Claims. (Cl. 74—200)

This invention relates to power transmission mechanisms of the torus type.

There have been proposed heretofore power transmissions comprising oppositely arranged toric elements. One element or set of elements is employed to drive the other element or set of elements through one or more motion-transmitting friction rollers. One such toric drive is disclosed and claimed in my copending application Serial No. 415,716, filed March 12, 1954.

It is an object of the present invention to provide a new and improved power transmission of the torus type.

It is another object of this invention to provide a torus-type transmission of improved load-handling capacity.

It is still another object of my invention to provide a torus-type transmission having sets or clusters of rollers disposed such that changes in load on the transmission are distributed between all the rollers of each set or cluster.

In accomplishing the foregoing objects, there is employed a pair of torus-shaped driving and driven elements with interposed motion transmitting friction rollers. In order to increase the load handling capacity of the device, I provide one or more sets of rollers, each set comprising a plurality of co-axially disposed rollers for transmitting motion between driving and driven elements. Each roller, even though approximately coaxial or generally aligned with respect to the adjacent rollers of each set, is mounted independently of the others and on the same side of the mounting point. Since the load-carrying capacity of a device of this type is a function of the number of load bearing contacts, a plurality of sets of rollers may be used. The rollers are mounted for pivotal movement in two planes. Means is provided for controlling progression of the rollers in response to load changes.

Figure 1:
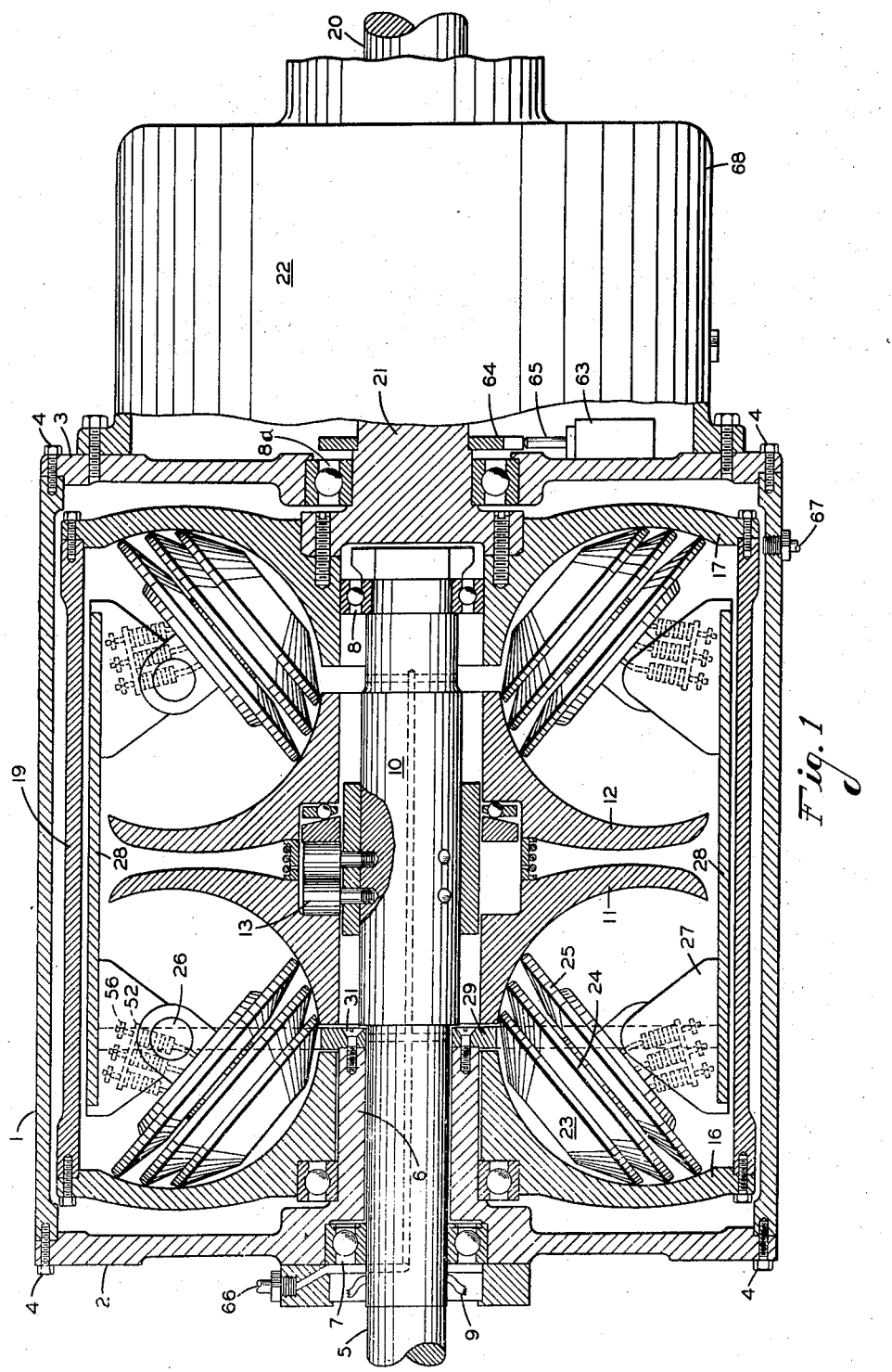
Figure 7:
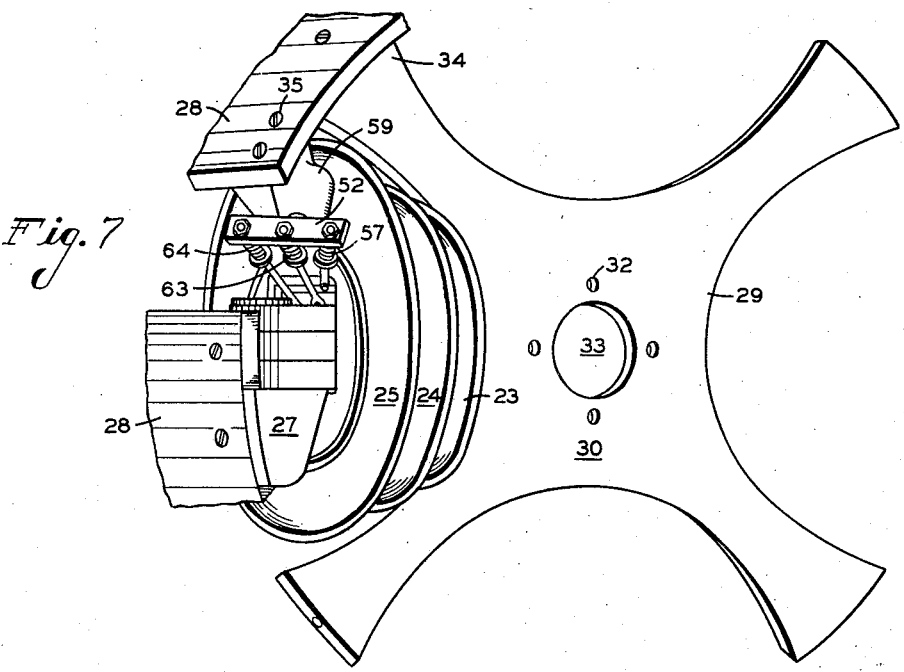
Figure 6:
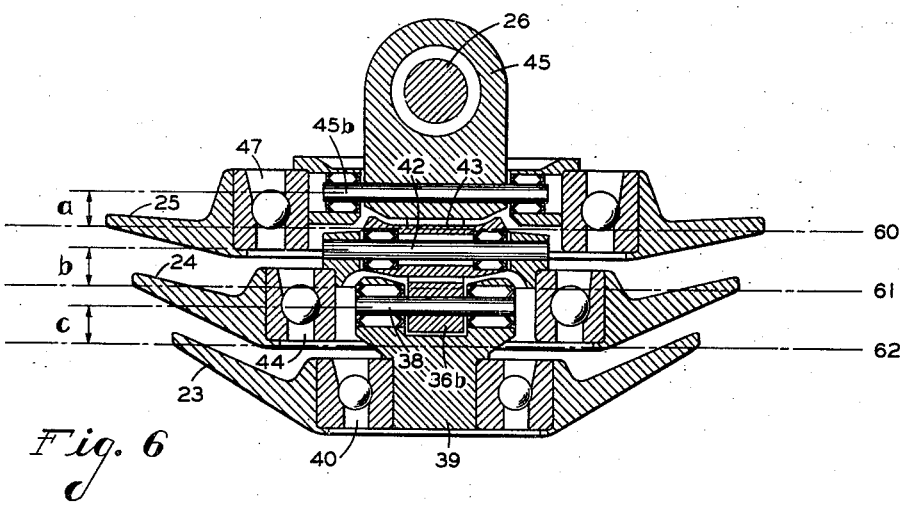

Further objects and advantages of this invention will be apparent from the following specification and accompanying drawings, in which Fig. 1 is a sectional view of a power transmission device embodying the principles of my invention, Fig. 2 is a side view, partly in section, taken along the line 2—2 of Fig. 3, of a set of motion-transmitting rollers and means for mounting them in the device of Fig. 1, Fig. 3 is a top view of the assembly shown in Fig. 2, Figs. 4 and 5 illustrate details of the assembly of Fig. 2, taken along the lines 4—4 and 5—5, respectively, of Fig. 2, Fig. 6 is a sectional view along the lines 6—6 of Fig. 2, Fig. 7 is a perspective view of parts of the assembly shown in Fig. 1, Fig. 8 shows, in section, a second embodiment of my invention, Fig. 9 is a sectional view along the line 10—10 of Fig. 8, Figs. 10 and 11 are sectional views of the upper chambers of the embodiment shown in Fig. 9, Fig. 12 is a partial, perspective view of the roller mount and control mechanism of the second embodiment, and Figs. 13, 14, and 15 illustrate details of the assembly of Fig. 12.

Referring to the drawings, there is shown in Fig. 1 a power-transmission device comprising a casing including a cylindrical housing 1 closed at the ends by end plates 2 and 3 secured in suitable fashion to housing 1 as by screws 4.

A suitable driving or input shaft 5 extends through hub 6 of end plate 2 into the interior of the casing.

A centrally located portion 10 of shaft 5, shown as of slightly larger diameter than the rest of shaft 5, is used to carry a pair of torus-shaped or toric elements 11 and 12 mounted back-to-back in driving relationship. For this purpose there is shown in generalized form a sprag and key system indicated generally by numeral 13. Since the details of this drive connection form no part of my invention and are well known, no further detail is believed necessary.

There is also provided a pair of driven toric elements 16 and 17 oppositely disposed in axially spaced-apart relationship to elements 11 and 12, respectively and cooperating therewith to define a toroidal chamber or passage. Element 16 is shown suitably journalled on hub 6 as by means of ball bearings. Element 17 may be positively connected to element 16 as by means of a cylindrical member 19 coaxial with and of lesser diameter than housing 1 suitably secured to elements 16 and 17 as by means of screws.

Means of any desired type may be utilized to drive output shaft 20 from the driven unit comprising elements 16 and 17 and member 19 as by means of stub shaft 21 suitably joined to element 17 as shown and clutching mechanism or gear assembly 22. The details of assembly 22 form no part of this invention and hence are not illustrated. Any arrangement known to the art may be used; for example, for automotive use, a sun-planet arrangement with the output connected to the ring gear is satisfactory. The various conditions of drive, reverse, parking, and neutral may be obtained by locking one or more elements of the gearing or releasing these elements, as the case may be. At this point it is noted that shaft 5 is suitably journalled in bearings in plate 2 and element 17 as generally indicated by numerals 7 and 8, and stub shaft 21 is suitably journalled in bearing 8a in plate 3. A suitable seal is indicated by numeral 9 at the place where shaft 5 enters hub 6.

Means is provided for utilizing rotation of elements 11 and 12 to drive (rotate) elements 16 and 17. In accordance with my invention, there is provided a plurality of sets of rollers, four sets of rollers being shown in Fig. 1. The rollers and toric elements are preferably made of metal.

In the illustrated embodiment of this invention each set comprises a plurality of rollers 23, 24 and 25 of generally conical cross-section disposed between and in driving engagement with the toric elements. These rollers are independently and coaxially mounted on a pin 26 suitably carried by lug 27 as explained in detail later in this specification. It will be noted that all rollers of the set lie between the pivot or mounting point represented by pin 26 and the toric axis of toric elements 11, 12, 16 and 17, and all rollers 23, 24, and 25 of each cluster or set lie on the same side of the pivot axis of the roller supports or the center line of the toroidal passage defining the toric elements. By providing sets of rollers, instead of single or unitary rollers in the manner of the prior art, the number of load bearing contacts is multiplied.

Each of lugs 27 is rigidly joined to the interior of a third cylindrical member 28, coaxial with cylinders 1 and 19 but of lesser diameter than either. There results a "nest" of three cylinders.

In order to locate properly cylinder 28 and the sets of rollers, there is provided a spider 29, the hub portion 30 of which is suitably secured to the inner end of hub 6 of end plate 2 as by screws 31 which extend through openings 32 into engagement with suitably threaded bores in hub 6. Shaft 5 extends freely through opening 33 in the spider. The arms 34 of the spider are secured to casing 28 as by screws 35 for example (see Fig. 7).

The means for mounting the rollers is best understood from Figs. 2, 6, and 7. Each roller may be described as a conically disposed annular member pivotally and rotatably carried by pin 26. Thus roller 23 is hung from generally L-shaped arm 36 which, at its upper end 36a, is pivotally carried by pin 26, suitable bearings 37 being interposed between portion 36a and pin 26. The lower end 36b of arm 36 comprises a suitable opening for receiving pivot pin 38 which, in turn, pivotally supports a block 39. Roller 23 is rotatably carried by the roller support member or block 39 through a suitable bearing, a ball bearing assembly 40 being illustrated.

Intermediate roller 24 is supported from pin 26 by J-shaped arm 41 which terminates in end 41a pivotally carried on pin 26 and enlarged end 41b receiving pin 42 which in turn carries tubular element or support member 43 upon which roller 24 is carried for rotation by means comprising ball bearing assembly 44. Suitable bearings at either end of arm 41 are provided.

Upper roller 25 is supported from pin 26 by arm 45, pin 45b, annular roller support member 46 and bearing assembly 47.

Pins 38, 42, and 45b may be press fit into block 39, element 43 and member 45, respectively.

With the foregoing arrangement, the center lines of the rollers 23, 24, and 25 are substantially coaxial as best seen in Fig. 2 wherein it is clear that pins 38, 42, and 45b lie on the axis of the rollers.

Freedom of rollers 23—25 to pivot about pin 26 enables the speed ratio of driving toric elements 11 and 12 to driven toric elements 16 and 17 to change under variations in load. Freedom of the rollers to pivot about the pivot pins 38, 42, and 45a also assists the assembly to progress or adjust to changes in load.

It should be noted that the pivotal axis of each roller lies to one side (above in Figs. 2 and 6) of a line drawn through the contact points on the circumference of the rollers. Referring to Fig. 6, dash-dot lines 60, 61, and 62, representing the lines through the contact points, lie below the axes of pivot pins 45b, 42, and 38, respectively, distances indicated by a, b, and c, respectively.

Let it be assumed that rollers 23—25 are rotating counterclockwise as viewed in Fig. 7. Under a given set of load conditions, forces on the rollers are balanced. However, any change in load conditions establishes an unbalance of forces which act along the lines 60, 61, and 62, the direction of the resulting force depending upon whether the load change is an increase or a decrease. Since the rollers are pivotally carried on pins offset from lines 60, 61, and 62 distances indicated by arrows a, b, and c, respectively, in Fig. 6, the rollers tend to pivot about the pivot pins 38, 42, and 45b in planes radial of the rollers. Thus the rollers are pivotally mounted in two perpendicularly disposed planes, the first being the plane through the pivot pins 38, 42, and 45b and through a diameter of the rollers and the second through the midplane of the torus, i. e., through pivot pin 26 normal to the toric axis. The offset nature of the rollers results in the roller pivots 38, 42, and 45b being positioned between the planes of the rollers themselves, taken at the contact edges, and the pivot pin 26.

An increase in load tends to cause the rollers to progress counterclockwise as viewed in Fig. 2 (in the plane of pin 26). Each roller is provided with independent means for opposing this tendency to progress. Referring to roller 23, there is provided a rod 50 pivotally attached to block 39 as by pin 51. The upper end of rod 50 extends through a suitable opening in flange 52 of L-shaped bracket 53. Bracket 53 is pivotally carried on cylinder 28 by means of lug 59 and pin 54. Rollers 24 and 25 have similar spring biasing means carried by bracket 53. As best seen in Fig. 3, bracket 53 and its assembly of springs is offset laterally with respect to pin 26 and hence, rollers 23—25, by an amount necessary to match the force-deflection curves of the springs to the needs of the rollers in all positions possible in the plane of Fig. 6. A compression spring 57 surrounds each rod and engages a suitable washer or flange 52 at one end and a washer 58 secured to the rod at the other end.

It is now believed obvious that increases in load are translated into upward movements of the rods and this movement is opposed by springs 57. This opposition assists in causing the associated ring to progress in a direction to permit the speed of rotation of output shaft 20 to be reduced, i. e., speed reduction takes place.

If it now be assumed that the load change is a decrease, progression takes place in the opposite direction. Under this condition, spring 57 tends to assist the progression as it expands to urge the pin downwardly.

The control springs, such as spring 57 may be calculated mathematically. It is believed sufficient for this description to note that the spring design is a function of the driving torque characteristics. A straight helical spring is satisfactory in many, if not most, applications.

The spring assemblies also function as stops or progression limiting means. Thus, spring 57, on compression, "goes solid" after a predetermined movement of the associated rod upwardly. Nut 56 limits motion of the rod in the downward direction.

In the plane of Fig. 6, the rollers are not necessarily in strict alignment because they assume positions giving equal drive ratios for each roller and toric element combination. The swing of the rollers relative to each other in the plane of Fig. 6 may be as much as three degrees thereby providing for sufficient shifting to accommodate inaccuracies in the shaping of the contacting surfaces of the rollers and the toric elements. The axes of the rollers thus may deviate as much as several degrees from truly coaxial positions but misalignment of the axes is slight, i. e., the axes at all times remain substantially or very nearly coaxial.

Summarizing, changes in load for a given input torque result in a speed ratio change and this change is stabilized or assisted by the independent spring sets. Thus, the springs constitute the main torque control means by balancing the tangential loads on the rollers; they determine the torque load required of the drive shaft 5; and the load-deflection curve of the springs coupled with the geometry of the unit determines how uniform this torque load is throughout the entire ratio range.

When the output load increases, the tangential force moments on the rollers exceed the control force moments and the rollers progress a little by pivoting in the plane of Fig. 2 and cause progression by pivoting in the plane of Fig. 6 in the direction to increase the reduction ratio and keep the input torque about the same. If the output load lessens, reverse rotation results and a speedup occurs. In this manner, progression occurs in a direction to restore a balanced condition.

The independent roller-spring assemblies also tend to produce equalization of contact load. A certain amount of equalization may also be obtained by designing the cross-sections of the rollers to have a certain amount of springiness.

Means is provided for lubricating the parts of the illustrated apparatus. Since the details form no part of my present invention, it is merely noted that double-acting pump 63 (Fig. 1) may be driven from shaft 21 through cam 64 and arm 65. The outlet of pump 63 may be connected (by means not shown) to inlet 66 whereby lubricant can be forced to desired points through the various passages shown by means of dashed lines. Drain 67 may be connected to the inlet of pump 63 in some suitable manner. The interior of casing 68 may serve as a sump.

Figs. 8 to 15, inclusive, disclose a second embodiment of my invention. Identical spring assemblies are utilized. Similar nests or sets of rollers are provided. In Figs. 8 and 9 there is shown a set of rollers 23', 24', and 25' pivotally carried by pivot pins 38', 42', and 45b', respectively. The rings are mounted on pin 26' corresponding to pin 26.

In the first-described embodiment, equalization of contact pressures or forces on the rollers is realized in part by designing the rollers to have a certain degree of resilience, flexibility, or springiness to provide a degree of contact force equalization. This has been effected by substantially reducing the cross-section of the rollers at the edges or circumference thereof. To avoid critical design and construction requirements, the rollers in this second embodiment are preferably rigid and means is provided in this second embodiment for equalizing forces on the rollers which is adjustable and effective under varied load conditions. In this emodiment, pin 45b', carrying rollers 25', is press fit through a longitudinally extending block 71. This block has seats 72 and 73 for ball ends 74 and 75, respectively, of pistons 95a and 95, respectively. Pin 42' is press fit through block 76 having arms 76a and 76b with seats 77, 78 for ball ends 79 of piston 96. Pin 38' is press fit through block 80 having upstanding arms 81 and 82 provided with seats 83 and 84, respectively, for ball ends 85 of pistons 94. The upper ends of the arms and the upper surface of block 71 are preferably in the same plane.

The piston-like movement of the various arms under changes in contact pressure on the rollers is utilized for the equalization function. These arms extend into a bifurcated recessed block 86. Portions 87 and 88 have longitudinally extended equalization chambers, 89 and 90, respectively. Depending from the chambers are passages. Thus chamber 90 communicates with downwardly extending passages 91, 92, and 93 corresponding to arm 81, block 71, arm 77, respectively. Within the chambers are located pistons 94, 95, and 96, the lower ends preferably having ball shaped ends 85, 75, and 79, respectively, although any desired shape may be used. Chamber 90 and passages 91, 92 and 93 above the pistons are filled with a suitable pressure-responsive medium as a hydraulic fluid or resilient material such as rubber, for example. I prefer to mold suitable soft rubber in these passages. The cross-sectional areas of the pistons 94—96 and passages 91—93 (as best seen in Figs. 10 and 11) are such that the forces on the rollers are balanced to the requirements determined by geometry so that contact forces are equal. Equalization takes place through transmission of forces through the arms, pistons, and force-transmitting medium. Portion 87 of block 86 is similarly arranged.

The pressure responsive medium may be inserted through openings 97 and 100. Threaded plugs may be used to close the opening as, for example, by screwing into suitable threaded bores. Variation in pressure may also be effected by the extent to which the plugs are inserted into the passages. In particular, plugs 101 are useful for the latter function. With this arrangement, sufficient equalization is available to correct for misalignment, mis-assembly, etc., even to such a degree that disengagement of one or more rollers from one or both torus elements may be corrected.

While I have shown and described a particular embodiment of my invention, it will be obvious to those skilled in the art that changes and modifications may be made without departing from my invention in its broader aspects. For example, while balled ends are shown on the pistons of the second embodiment, actual balls and suitable ball-receiving recesses may be employed. I, therefore, aim in the appended claims to cover all such changes and modifications as fall within the true spirit and scope of my invention.

What I claim is:

1. In a power transmission device, a toric driving element, an oppositely disposed toric driven element coaxial therewith thereby defining a toroidal passage, and a set of rollers between and in driving engagement with said elements, said rollers being disposed substantially coaxially on the same side of the center line of said passage.

2. The device of claim 1 in which said rollers are independently mounted in said substantial coaxial disposition.

3. The device of claim 1 in which said rollers have different diameters whereby said rollers engage said elements at different locations on said elements.

4. In a torque-responsive power transmission device, a toric driving element, an oppositely disposed toric driven element coaxial therewith thereby defining a toroidal passage, a set of substantially coaxially disposed rollers between and in driving engagement with said elements, said rollers being disposed on the same side of the center line of said passage, and means for pivotally supporting said rollers to permit progression of said rollers to new positions under the influence of the contact forces at the edges of said rollers.

5. The device of claim 4 together with means for controlling said progression.

6. In a torque-responsive power transmission device, a toric driving element, an oppositely disposed toric driven element coaxial therewith thereby defining a toroidal passage, a set of substantially coaxially disposed rollers between and in driving engagement with said elements, said rollers being disposed on the same side of the center line of said passage, means for pivotally supporting said rollers to permit progression of said rollers according to load requirements, and means engaging said rollers and acting in response to changes in load requirements for equalizing the contact forces on the rollers of said set as the load requirements change.

7. In a torque-responsive power transmission device, a toric driving element, an oppositely disposed toric driven element coaxial therewith thereby defining a toroidal passage, a set of substantially coaxially disposed rollers between and in driving engagement with said elements, said rollers being disposed on the same side of the center line of said passage, means for pivotally supporting said rollers to permit progression of said rollers to change the speed ratio between said elements according to changes in load requirements, and means for controlling said progression.

8. The device of claim 7 in which said controlling means comprises a compression spring.

9. The device of claim 7 in which independent controlling means is provided for each roller.

10. In a torque-responsive power transmission device, a toric driving element, an oppositely disposed toric driven element coaxial therewith thereby defining a toroidal passage, a set of substantially coaxially disposed rollers between and in driving engagement with said elements, said rollers being disposed on the same side of the center line of said passage, means for pivotally supporting said rollers to permit progression of said rollers to change the speed ratio between said elements according to increases in load requirements, and means for opposing said progression.

11. In a torque-responsive power transmission device, a toric driving element, an oppositely disposed toric driven element coaxial therewith thereby defining a toroidal passage, a set of substantially coaxially disposed rollers between and in driving engagement with said elements, said rollers being disposed on the same side of the center line of said passage, means for pivotally supporting said rollers to permit progression of said rollers to change the speed ratio between said elements according to decreases in torque requirements, and means limiting said progression.

12. The device of claim 8 in which said spring is arranged to go solid at a predetermined position of said rollers with respect to said elements and thereby constitute a stop for preventing further progression of said rollers under increases of load.

13. In a torque-responsive power transmission device, a toric driving element, an oppositely disposed toric driven element coaxial therewith thereby defining a toroidal passage, a plurality of substantially coaxially disposed rollers between and in driving engagement with said elements, said rollers being disposed on the same side of the center line of said passage, means for pivotally supporting said rollers to permit progression of said rollers to change the speed ratio between said elements according to changes in torque requirements, and means for limiting progression of said rollers.

14. In a power transmission device, a toric driving element, an oppositely disposed toric driven element coaxial therewith thereby defining a toroidal passage, and a roller between and in driving engagement with said elements, said roller being pivotally mounted in the midplane of the torus and also pivotally mounted in a plane radial to the faces of the toric elements.

15. The device of claim 14 in which the second mentioned pivot is interposed between the plane of the roller and the first pivot whereby a couple is produced by the tangential forces on the rollers.

16. The device of claim 15 in which control means is provided for opposing the tangential forces on the rollers due to the offset position of the second mentioned pivot.

17. The device of claim 16 in which the control means is a spring.

18. The device of claim 16 in which said control means is also pivotally mounted in an axis offset from the first mentioned pivot.

19. In a power transmission device having a toric driving element, a toric driven element and a roller in driving engagement therebetween, said roller being mounted to pivot in two planes at right angles to each other and to the axis of the roller; the combination therewith of means responsive to a pivoting movement in one plane for causing a progression of the roller by pivoting in the second plane, thereby changing the drive ratio between the toric elements.

20. The device of claim 19 in which the pivoting in the said one plane is responsive to tangential forces on the roller and to an opposing force provided by a control means, whereby change of such tangential forces causes progression in a direction to restore a balanced condition.

21. The device of claim 1 in which the cross-section of each of said rollers is substantially reduced toward the circumference thereof whereby the resulting flexibility provides a degree of contact force equalization.

22. The device of claim 4 in which said rollers are also disposed between the toric axis of said elements and the point of pivotal support.

23. The device of claim 4 in which the point of pivotal support is located substantially at the center of the cross section of the toroidal passage.

24. The device of claim 1 in which the means for mounting each roller comprises a roller support member rotatably supporting a roller, means pivotally connected to said support member, and a pivot member fixed in position with respect to said rollers, said pivotally connected means being carried by said pivot member.

25. The device of claim 1 in which the means for mounting each roller comprises a roller support member rotatably supporting a roller, an arm pivotally attached at one end thereof to said support member, and a pivot member fixed in position with respect to said arms and said rollers, said arms being pivotally attached at the other ends thereof to said pivot member.

26. The device of claim 25 in which said arms are so shaped that the pivotal connections thereof to the respective support members are substantially in alignment whereby said rollers are substantially coaxially mounted.

27. The device of claim 24 in combination with a block having an equalization chamber, a plurality of passages equal in number to the number of rollers and extending through said block from said chamber and opening in the vicinity of the respective pivotally connected means, a piston in each passage, the outer end thereof arranged to engage one of said pivotally connected means, and a pressure-responsive medium in said chamber.

28. The combination of claim 27 wherein the cross-sectional areas of said passages and pistons are such that equalization of contact pressures on said rollers is provided.

29. In a variable speed transmission device, a toric driving element, an oppositely disposed toric driven element coaxial therewith, a plurality of friction rollers between and in driving engagement with said elements, means for separately mounting said rollers for said engagement, said separate mounting means permitting movement of any roller wholly independently of the movement of any other roller, said mounting means providing for pivotal movement of said rollers relative to said elements thereby enabling variation of the speed ratio between said elements, and means for also permitting axial rotation of said rollers about their own axes.

References Cited in the file of this patent
UNITED STATES PATENTS

| | | |
|---|---|---|
| 1,904,046 | Hayes | Apr. 18, 1933 |
| 1,985,110 | Sharpe | Dec. 18, 1934 |
| 2,039,288 | Austin | May 5, 1936 |
| 2,097,007 | Weisel | Oct. 26, 1937 |
| 2,140,046 | Hayes | Dec. 13, 1938 |
| 2,734,389 | Strecker | Feb. 14, 1956 |
| 2,786,363 | Davies et al. | Mar. 26, 1957 |